Jan. 14, 1958     G. P. KRAUSE     2,819,794
EXTRUSION PRESS MANDREL
Filed Dec. 11, 1953

United States Patent Office 2,819,794
Patented Jan. 14, 1958

2,819,794

EXTRUSION PRESS MANDREL

Gerhard P. Krause, Harrison, N. Y., assignor, by mesne assignments, to Baldwin-Lima-Hamilton Corporation, Philadelphia, Pa., a corporation of Pennsylvania Application December 11, 1953, Serial No. 397,677

1 Claim. (Cl. 207—3)

This invention relates to extrusion presses and has for its object the provision of means for extruding metal tubes having a uniform internal contour but an external contour which varies along the length of the tube to form, e. g., an external taper.

More particularly, the invention relates to tube extrusion presses comprising a die having a central opening and a centrally positioned mandrel of a cross-sectional area smaller than the area of the die opening, so that as the mandrel proceeds into the die, the tube is extruded between the mandrel and the die opening. In each position occupied by the mandrel during extrusion, the thickness of wall of the extruded tube is determined by the passage of smallest cross-sectional area between the mandrel and the die. If the dimensions of this passage remain constant, a tube of constant wall thickness will be extruded. In the present invention, however, it is an object to extrude tubes with constant internal contour and an outside contour which continually increases along the entire length of the tube or increases along parts of the length.

It has been prepared heretofore to extrude tapered tubes by using a cone-shaped mandrel, the part of the cone of largest diameter entering the die opening first to yield the thinnest tube wall, and as portions of the cone of smaller diameter enter the die opening, the thickness of the extruded wall increases. In this prior form, the opening of smallest area is, for each position of the mandrel, formed by the fixed entrance to the die and the cooperating section along the cone-shaped mandrel. This necessitates pushing the extruded metal upwardly along the inclined surface of the cone to pass over the portion of the cone of largest diameter which determines the constant inner diameter of the tube. Since the pressure on the extruded metal is relieved as soon as it passes the opening of smallest area, it is difficult, and would in some cases be impossible, to push the extruded metal in the prior device along the cone and over the largest section thereof. The prior device is operative only within limited proportions of wall thickness to outside taper of the tubes.

It is therefore the principal object of this invention to provide means for extruding tubes of the above type having any desired wall thickness. This is made possible by providing means whereby the opening of effectively smallest area which determines the thickness of the extruded wall is always formed at the largest section of the mandrel head, and therefore there does not arise the necessity for pushing the extruded tube over a larger portion of the mandrel after passing the opening of effectively smallest area and after the extrusion pressure has dropped.

Further objects and advantages of this invention will become apparent in the following detailed description thereof.

In the accompanying drawings.

Figure 1:
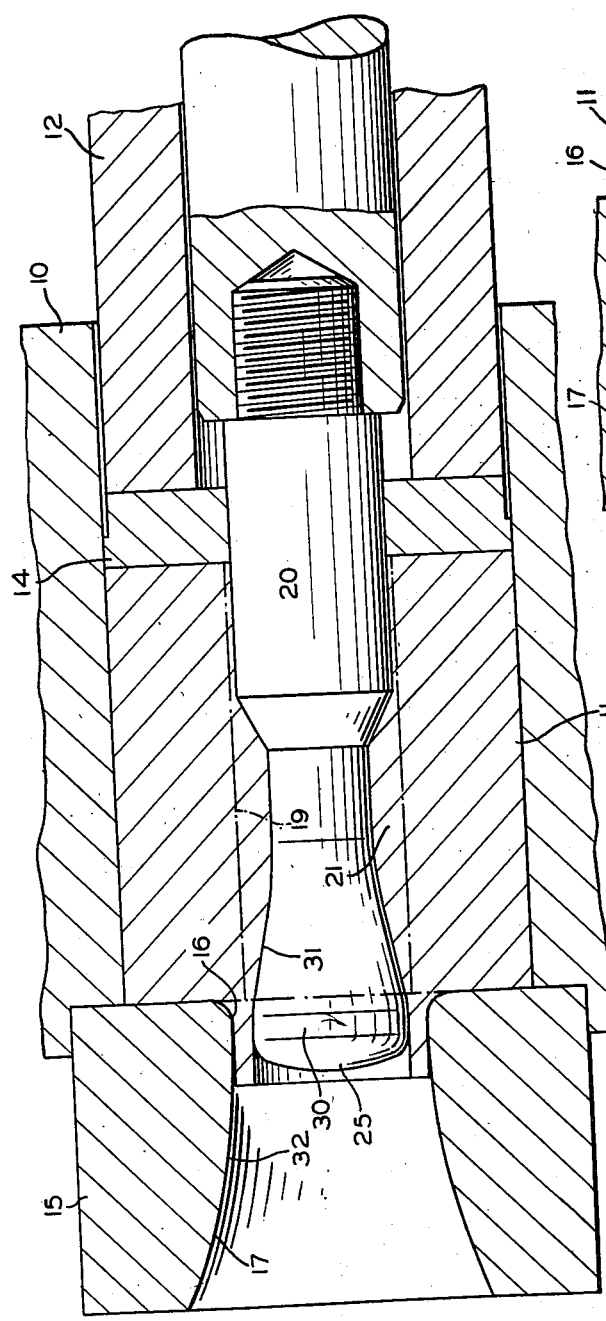
Fig. 1 is a vertical section through a portion of an extrusion press showing the parts at the beginning of the extrusion process.

Referring to the drawings, there is shown the metal container 10 of an extrusion press within which the metal billet 11 is positioned. An extrusion ram or stem 12 actuated by hydraulic apparatus (not shown) is adapted to engage a pressing disc 14 which in turn engages the billet to force it through a die 15 at the outer end of the container. The die has an entrance opening 16, and the portion of the die bore extending from this entrance opening to the region indicated at 17 is adapted to be effective in shaping the metal as will be explained hereinafter. Since it is desired to extrude hollow tubular articles, there is provided also a mandrel 20 which may either be fixed to the extrusion ram 12, or as shown, may be mounted for independent movement relative to the ram by hydraulic pressure in a cylinder (not shown). The mandrel is of smaller diameter than the die opening, so that the extruded metal will be in the form of a tube whose wall thickness is one-half the difference between the diameter of the die opening and the mandrel diameter.

It should be noted that the billet 11 is drilled or pierced as indicated in dot- and dash-lines at 19 before it is charged into the container, so that the mandrel can easily be introduced into the billet. When the extrusion ram 12 is advanced, the billet is compressed and will bear against the mandrel as indicated at 21.

If the mandrel diameter were constant, the wall thickness of the extruded tube would be constant and would be determined by the opening of smallest area between the mandrel and the die. This occurred usually at the inner opening or entrance to the die. However, it is the object of this invention to produce a tube of constant inner diameter but of increasing outer diameter to form, e. g., a taper. The mandrel head instead of being of constant diameter is here formed in the shape of a head with diminishing diameter toward the rear, so that the distance and area between the mandrel head and the die entrance opening 16 will increase as the mandrel moves further into the die, thus yielding a continuously thicker extrusion. A similar shape of the mandrel has been proposed but is of limited operativeness because, as indicated in the introduction hereto, the pressure is relieved as soon as the extruded metal passes the smallest passage, and without such pressure it is difficult to push the extruded metal along the mandrel head and over the largest diameter thereof which determines the constant internal diameter of the tube. It will be understood that the extruded metal moves considerably faster than the mandrel. Such limitation on the operativeness of devices heretofore proposed is due to the fact that therein the successive sections of the mandrel head which cooperate with the fixed entrance to the die will always form the smallest passage, and in the adjacent portions of the die the passage will enlarge to reduce the pressure, thus making it difficult or sometimes impossible to push the extruded tube over the largest section of the mandrel head, when the largest section has moved forwardly beyond the smallest passage.

Figure 3:
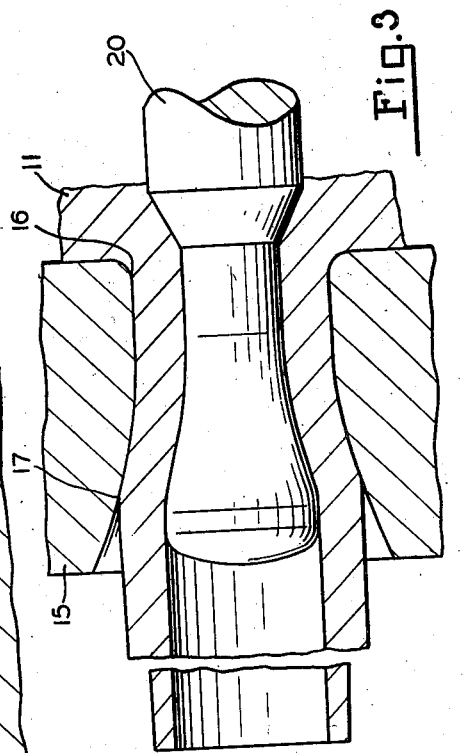
Figs. 2 and 3 are portions of the extrusion press of Fig. 1 showing successive stages of the extrusion process.
Figure 2:
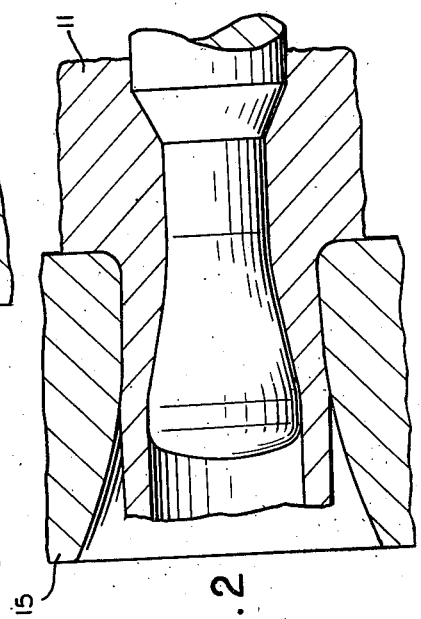

By this invention, I cause the effectively smallest passage, which determines the wall thickness of the tube, to be formed always at the largest diameter of the mandrel head. Therefore even though the pressure is reduced after leaving the smallest passage, it will have no effect on the extrusion since the tube will have passed the largest section of the mandrel head which determines the constant internal diameter of the tube, and there will be no necessity for large pressures after extrusion to force the tube over a section of the mandrel head of larger diameter, as was heretofore the case. For this purpose, I cause the largest section 30 of the mandrel head 25 to cooperate with successive sections of the die in such manner as to form effectively smallest passages of progressively increasing size. To accomplish this, I provide (1) that the diameter of the effective portion of the die opening will become larger from the entrance 16 thereof outwardly at a predetermined rate as shown at 32, in accordance with the desired outer tube dimensions, and (2) that the mandrel head will recede from the section of largest diameter rearwardly, as shown at 31, at a rate greater than, or at least substantially equal to, the rate at which the effective portion of the die opening increases. Thus, if the rate of decrease at surface 31 of the mandrel head is greater than the rate of increase at surface 32 of the die bore, the smallest extrusion passage will, in every operative portion of the mandrel, be formed at the largest section 30 of the mandrel head. However, even if both rates are substantially equal, the effectively smallest extrusion passage will still be formed at the largest section 30 of the mandrel head due to frictional resistance to flow of metal through the passage between surfaces 21 and 32. Therefore, my arrangement insures (1) that in every operative position of the largest section 30 of the mandrel head, it will form with the die opening the effectively smallest passage through which the metal can be extruded, and (2) that as the mandrel head moves through the die in accordance with Figs. 2 and 3, this smallest extrusion passage will become continuously larger. The mandrel will not be moved beyond the position shown in Fig. 3.

Since the effectively smallest passage is thus always formed at the largest diameter section of the mandrel head, there does not arise the problem which existed in solutions heretofore proposed, i. e., where the smallest passage was formed successively by points along the receding mandrel head cooperating always with the die entrance. The latter condition, as soon as the largest section of the mandrel head had moved beyond the die entrance, necessitated pushing the extruded metal over the larger section of the mandrel head after the metal had left the smallest passage, but as the pressure is relieved as soon as the metal passes the smallest opening, this is difficult and would be impossible in the case of certain proportions of wall thickness to outside taper.

It will be clear that if the position of the mandrel is changed continuously, the tube produced will have a continuous outside taper. If movement of the mandrel is carried out in steps, the tube will have a stepped outer contour.

The tubes produced may be round or may have any other cross-sectional contour in accordance with the shape of the selected die opening and mandrel.

Having described my invention, what I claim and desire to secure by Letters Patent is:

In an extrusion press for extruding metal tubes of varying outer contour, said press having a container for supporting a metal billet, a die cooperating with the forward end of the container, said die having a bore therethrough, an extrusion ram adapted to enter the container at the rearward end thereof to force the billet through the die, and a mandrel of varying diameter having a head adapted to enter the die bore, the improvement which consists in said die bore having its minimum diameter substantially at its rearward end through which the mandrel head enters, and said bore having a portion increasing in diameter progressively toward its forward end at a predetermined rate, said mandrel head having a section of maximum diameter adjacent the forward end thereof and having a portion whose diameter diminishes progressively rearwardly from said section of maximum diameter at a rate of decrease at least substantially equal to said predetermined rate of increase of said die bore diameter.

References Cited in the file of this patent

UNITED STATES PATENTS

| 327,292 | McCloskey | Sept. 29, 1885 |
| 1,963,320 | Wright | June 19, 1934 |

FOREIGN PATENTS

| 467,168 | Canada | Aug. 8, 1950 |